(12) United States Patent
Prellwitz (10) Patent No.: US 10,946,915 B2
(45) Date of Patent: Mar. 16, 2021

(54) ELECTRONIC TWO-WHEELER LOCK

(71) Applicant: ABUS August Bremicker Söhne KG, Wetter-Volmarstein (DE)

(72) Inventor: Christian Prellwitz, Burbach (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 0 days.

(21) Appl. No.: 16/045,163

(22) Filed: Jul. 25, 2018

(65) Prior Publication Data

US 2019/0031262 A1 Jan. 31, 2019

(30) Foreign Application Priority Data

Jul. 26, 2017 (DE) .......................... 102017116941.5

(51) Int. Cl.

| | | |
|---|---|---|
| *E05B 47/00* | (2006.01) | |
| *B62H 5/08* | (2006.01) | |
| *E05B 71/00* | (2006.01) | |
| *E05B 63/00* | (2006.01) | |
| *B62H 5/14* | (2006.01) | |
| *E05B 81/14* | (2014.01) | |
| *E05B 81/56* | (2014.01) | |

(Continued)

(52) U.S. Cl.
CPC ................. *B62H 5/08* (2013.01); *B62H 5/14* (2013.01); *E05B 47/00* (2013.01); *E05B 63/0056* (2013.01); *E05B 71/00* (2013.01); *E05B 81/14* (2013.01); *E05B 81/56* (2013.01); *E05B 81/68* (2013.01); *E05B 81/72* (2013.01); *E05B 2047/0094* (2013.01)

(58) Field of Classification Search
CPC .... B62H 5/00; B62H 5/08; B62H 5/14; E05B 47/00; E05B 63/0056; E05B 71/00; E05B 81/14; E05B 81/56; E05B 81/68; E05B 81/72; E05B 2047/0094
USPC .......................................... 70/225, 226, 233
See application file for complete search history.

(56) References Cited

U.S. PATENT DOCUMENTS

| | | |
|---|---|---|
| 5,291,761 A | 3/1994 | Lii |
| 6,761,051 B1 | 7/2004 | Tsai |
| 7,360,450 B2 | 4/2008 | Muller |

(Continued)

FOREIGN PATENT DOCUMENTS

| | | |
|---|---|---|
| CN | 204418837 U | 6/2015 |
| CN | 105480329 A | 4/2016 |

(Continued)

*Primary Examiner* — Suzanne L Barrett
(74) *Attorney, Agent, or Firm* — Dinsmore & Shohl LLP (57) ABSTRACT

An electronic two-wheeler lock includes a latch element movable between an open position and a closed position, a blocking mechanism that blocks the latch element in a latched state against departing from the closed position and releases it for a departure from the closed position in an unlatched state, an electric drive unit configured to move the blocking mechanism into the unlatched state, and a control unit configured to control the drive unit. The two-wheeler lock has a modular structure and includes a drive module and a communication unit, with the drive module including a module housing in which at least the blocking mechanism, the drive unit, and the control unit are received. The control unit is configured to receive control signals from the communication unit in encrypted form and to control the drive unit in response to the control signals.

20 Claims, 1 Drawing Sheet

(51) Int. Cl.
*E05B 81/68* (2014.01)
*E05B 81/72* (2014.01)

(56) References Cited

U.S. PATENT DOCUMENTS

| | | | |
|---|---|---|---|
| 8,727,398 B2 | 5/2014 | Brose et al. | |
| 10,220,899 B2* | 3/2019 | Yang | B60R 25/34 |
| 10,370,869 B2* | 8/2019 | Yang | G07C 9/00944 |
| 10,450,021 B2* | 10/2019 | Anuth | G07C 9/00571 |
| 10,544,624 B2* | 1/2020 | Baker | E05B 65/0021 |
| 2009/0282876 A1 | 11/2009 | Zuraski et al. | |
| 2014/0000322 A1* | 1/2014 | Williams | E05B 73/0011 70/18 |
| 2014/0138439 A1 | 5/2014 | Jurisch et al. | |
| 2014/0266588 A1 | 9/2014 | Majzoobi | |
| 2016/0031506 A1* | 2/2016 | Lloyd | G05D 3/10 701/49 |
| 2016/0221627 A1* | 8/2016 | Hines | B62J 11/00 |
| 2017/0069154 A1* | 3/2017 | Hilton | G07C 9/00182 |
| 2018/0015974 A1* | 1/2018 | Yang | B60R 25/34 |
| 2018/0080256 A1* | 3/2018 | Yang | B62H 5/20 |
| 2018/0118294 A1* | 5/2018 | Anuth | B62H 5/003 |
| 2018/0182196 A1* | 6/2018 | Duan | H04L 63/083 |
| 2018/0244329 A1* | 8/2018 | Mori | B62H 5/06 |
| 2018/0362105 A1* | 12/2018 | Mori | B62H 5/00 |
| 2019/0017294 A1* | 1/2019 | Sternlight | E05B 73/0005 |
| 2019/0032729 A1* | 1/2019 | Gao | F16D 41/26 |
| 2019/0292815 A1* | 9/2019 | Hu | B62H 5/147 |
| 2019/0306679 A1* | 10/2019 | Duan | B60R 25/1001 |

FOREIGN PATENT DOCUMENTS

| | | |
|---|---|---|
| CN | 106761003 A | 5/2017 |
| CN | 106892027 A | 6/2017 |
| DE | 10056119 B4 | 12/2005 |
| DE | 102005041288 A1 | 3/2007 |
| DE | 102011018185 A1 | 10/2012 |
| DE | 102011054684 A1 | 4/2013 |
| DE | 102012221016 A1 | 5/2014 |
| DE | 102013217075 A1 | 3/2015 |
| DE | 102015013228 A1 | 9/2016 |
| EP | 1760232 A2 | 3/2007 |
| WO | 2009040074 A1 | 4/2009 |
| WO | 2017097099 A1 | 6/2017 |

* cited by examiner

ELECTRONIC TWO-WHEELER LOCK

CROSS-REFERENCE TO RELATED APPLICATIONS

This application claims priority to German Patent Application No. DE 102017116941.5 filed on Jul. 26, 2017, the entire contents of which are incorporated herein by reference.

TECHNICAL FIELD

The present disclosure relates to an electronic two-wheeler lock having a latch element that is movable between an open position and a closed position, a blocking mechanism that blocks the latch element in a latched state against departing from the closed position and releases it for a departure from the closed position in an unlatched state, an electric drive unit that is configured to move the blocking mechanism into the unlatched state, and a control unit that is configured to control the drive unit. In the closed position of the latch element, the latch element secures an associated two-wheeler at which the two-wheeler lock is arranged against unauthorized use.

BACKGROUND

Electronic two-wheeler lock may, for example, be configured as a frame lock of a bicycle. In such a frame lock, the latch element typically engages between the spokes of the rear wheel in the closed position and blocks said rear wheel against rotation in this manner. In simple frame locks, the latch element that may, for example, be a rotatable round hoop, a pivot hoop, or a linearly movable hoop, is moved by hand into the closed position in which it is advantageously latched by the blocking mechanism, preferably in a catching manner. The latch element is held in the closed position in this manner and may only depart from the closed position again when it has previously been unlatched again. An actuation of the latching blocking mechanism by a key associated with the lock is then expediently a requirement for an unlatching of the latch element. As soon as the latch element is unlatched, e.g. by rotating the key in the lock, it may again be moved into its open position releasing the respective wheel. This advantageously takes place automatically directly subsequent to the unlatching, for instance in that the latch element is preloaded into the open position.

In some of such frame locks, the key remains inserted in the lock as long as the lock is open and may only be withdrawn with a closed lock. The key may therefore not be fastened to a key ring since this could otherwise move between the spokes during the ride. In other frame locks, the key may generally also be withdrawn with an open lock. However, it also represents an improvement of comfort in such a frame lock when it may be avoided that a key has to be actuated directly at the frame lock since the frame lock is typically arranged in the region of the spokes and of the wheel that are typically dirty and since access is not necessarily easy there.

An improvement of the comfort may be achieved, for example, by electronic two-wheeler locks that have an electric (e.g. electromechanical or electromagnetic) drive unit that may be controlled to unlatch the latch element such that it may subsequently be moved into the open position. Since a manual actuation may thus be dispensed with at least for the unlatching, the use of the two-wheeler lock is facilitated, in particular when the latch element is subsequently still automatically moved into the open position, for instance as a result of a preload. When the movement of the latch element into the closed position takes place by a manual actuation with such a lock and when the blocking mechanism then automatically blocks the latch element, one speaks of a semiautomatic two-wheeler lock.

The provision of an electronic two-wheeler lock may specifically be useful with so-called E-bikes or pedelecs that have an electric (auxiliary) drive so that an energy supply is anyway provided with such two-wheelers that may then also be used for the two-wheeler lock. In addition, such two-wheelers may have central operating systems such as a display with an input possibility that may be arranged e.g. at the handlebars of the two-wheeler for good accessibility. Such operating systems may then also be usable for an authorization check, e.g. using a key, a numerical code, another code, or a fingerprint, as a requirement for an unlatching of the two-wheeler lock. An actuation of the two-wheeler lock may thus in particular take place comfortably with such an operating systems. Such operating systems may naturally not only be provided with electrically driven two-wheelers. In addition, the operating systems do not necessarily have to be arranged in a stationary position at the two-wheeler. They are advantageously at least releasable from or even independent of the two-wheeler, for example when the operating systems are connected to a central unit of the two-wheeler via radio or are directly connected to the two-wheeler lock to ultimately control the drive unit of the two-wheeler lock for an unlatching via the control unit. Such operating systems may also only be carried out as a software application, e.g. on a smartphone, so that the respective user device with which the operating systems may be implemented do not necessarily have to be a part of the respective two-wheeler system or of the two-wheeler lock system.

The fact that the electronic two-wheeler lock may be controlled comfortably from a "distance" (that is e.g. from a user device at the handlebars of the respective two-wheeler or from a user device carried by the rider) for the unlatching and that the unlatching then takes place in a driven manner may, however, also make the two-wheeler lock more prone to attacks. For communications systems have to be provided at the two-wheeler lock for a control from the outside that may under certain circumstances be used to control the two-wheeler lock to unlatch in an unauthorized manner, for instance in that simulated unlatching commands are sent to the two-wheeler lock. An encryption may be provided for such an external communication to make such attacks more difficult. When, however, an attacker succeeds in directly contacting the control unit or the drive unit of the two-wheeler lock, an encrypted external communication could be bypassed in this manner. When the drive unit comprises an electric motor, for instance, and is in particular at least substantially configured as an electric motor, it could, for example, be sufficient for an unauthorized unlatching of the blocking mechanism that holds the latch element in the closed position to contact and apply current to the electric motor directly so that it unlatches the blocking mechanism. Such a direct intervention in the two-wheeler lock may generally be made at least more difficult mechanically by a lock housing. However, due to the screening effect of a lock housing formed from a hard metal, a radio-based communication with external devices would be prevented or at least impaired by it.

A further difficulty results with respect to the possibilities of using the two-wheeler lock in conjunction with different user devices and/or different vehicle systems of respective two-wheelers since they may require very different communication modes. An electronic two-wheeler lock may generally have corresponding communication systems for a plurality of different communication modes, e.g. for different communication protocols. However, the costs of the two-wheeler lock are thereby increased since a plurality of communication systems are provided of which then only one is used depending on the respective two-wheeler and/or user device.

SUMMARY

It is an object of the present disclosure to provide an electronic two-wheeler lock that may be efficiently produced and variably used, that enables a comfortable securing of the respective two-wheeler, and that in so doing is particularly securely configured against an unauthorized opening of the lock.

The object is satisfied by an electronic two-wheeler lock and by a corresponding modular system for forming an electronic two-wheeler lock having the features disclosed in the following description and the FIGURE.

In accordance with the present disclosure, the two-wheeler lock has a modular design and comprises at least one drive module and a communication unit. The communication unit may in particular be configured as a communication module and may thus, as a further module of the two-wheeler lock in addition to the drive module, form a spatially uniform, in particular closed and generally replaceable, functional unit. Such a modular design generally makes it possible to provide respective separate modules for different part tasks of the lock (such as a powered unlatching or the communication with an external device). A plurality of different modules may in particular generally be provided for a respective part task that implement the respective part task in different manners (e.g. are configured in different manners for communication with an external device) and from which then a respective module may be selected during production or also on a retrofitting of the lock in dependence on a specific requirement. Different variants of the two-wheeler lock may thus be implemented in a simple manner from a construction aspect.

The drive module comprises a module housing in which at least the blocking mechanism, the drive unit, and the control unit are received such that they are protected against mechanical effects from the outside. For this purpose, the module housing may, for example, comprise a particularly hard material, for example a hard or hardened metal, e.g. steel, and/or may have a structure that gives it a special strength. The blocking mechanism, the drive unit, and the control unit here do not necessarily have to be completely surrounded by the module housing. A drive shaft of the drive unit could project out of the module housing, for example. In some embodiments, the blocking mechanism, the drive unit, and the control unit are, however, each completely received in the module housing and are in this manner particularly reliably protected from an effect from outside, e.g. a mechanical manipulation or an electric contact. The module housing furthermore does not have to be closed over the whole periphery. The module may in particular also have openings for the interaction of the drive unit the with latch element; they may, however, may be comparatively small, e.g. restricted to a proportion of less than 20%, or less than 10%, in comparison with the outer surface of the module housing, and are in particular arranged such that they at least do not allow any access to the blocking mechanism. The two-wheeler lock may in particular be configured such that all the openings in the module housing are substantially blocked, e.g. by the latch element itself, at least in the closed position or at least in the latched state of the blocking mechanism.

The module housing bounds the drive module with respect to the communication unit and, optionally, with respect to further modules of the two-wheeler lock. The module housing is therefore not simply the housing of the two-wheeler lock in which substantially all the components of the two-wheeler lock are received. The module housing is rather only the housing of the drive module. At least the communication unit is in particular provided outside the module housing. When the two-wheeler lock has further modules in addition to the drive module, their components are also not received in the module housing of the drive module. However, the communication unit and/or, optionally, further modules may have respective separate module housings by which it and/or they is/are delineated with respect to the drive module and also with respect to one another.

Since a separate module housing is provided for the drive module, the drive module that accommodates the blocking mechanism and the mechanism for releasing the blocking mechanism and that is therefore particularly importance for the reliability of the two-wheeler lock may be particularly reliably protected from interventions from the outside. For the components of the drive module are separately encapsulated within the two-wheeler lock by the module housing so that the general security against manipulation of the two-wheeler lock is additionally increased specifically for these components.

In addition to the drive module, the two-wheeler lock has at least the communication unit via which it may be connected to devices external with respect to the two-wheeler lock. The communication unit is internally at least connected to the drive module so that it is possible to address the drive module from the outside via the communication unit.

In accordance with the present disclosure, the control unit of the drive module is configured to receive control signals from the communication unit in encrypted form and to control the drive unit in response to the control signals. In other words, the internal communication between the communication unit and the drive module takes place in encrypted form. The fact that the signal is present in encrypted form here does not simply mean that the signal represents the respective information to be transmitted in accordance with a specific signal protocol. Encryption is rather to be understood such that the respective signal is transformed into a form in which a conclusion is possible on the information underlying the signal substantially only with knowledge of a locking secret (cryptographic key). Without the locking secret, the signal may in contrast at best be decrypted with a substantial effort, in particular a time effort, that makes an overcoming of the encryption practically impossible.

Such a design of the electronic two-wheeler lock also provides an additional improvement of the safety in a technical signal respect in addition to the described mechanical improvement of the security against manipulation as a result of the encapsulation of the drive module in a separate module housing. It is generally expedient to encrypt the external communication between external operating systems, such as a user device, and the communication unit. When, however, only the external communication is encrypted, but signals are transmitted within the two-wheeler lock from the communication unit to the drive module in unencrypted form, this internal communication represents a weak point in the security of the two-wheeler lock. For when an attacker succeeds in obtaining access to the internal communication path, he could address the control unit directly and could control the drive unit to unlatch the lock via it. Such a technical signal penetration into the drive module is in contrast prevented by the encrypted internal communication between the communication unit of the two-wheeler lock and the control unit of the drive module. The control signals are in particular only decrypted within the drive module and are directly used for a corresponding control of the drive unit. The drive module is in this manner not only mechanically secured toward the outside by the module housing, but also in a technical signal manner by the encryption.

When the communication unit is configured to receive control commands transmitted from outside the two-wheeler lock in encrypted form, the communication unit may generally forward these control commands internally simply as encrypted control signals to the control unit of the drive module. In some embodiments, the communication unit is, however, configured to receive control commands and to generate a respective control signal in dependence on a respective received control command and to output it in encrypted form to the control unit of the drive module. In other words, the control signals are only first generated by the communication unit and are then transmitted to the control unit of the drive module in encrypted form, with a different kind of encryption and/or a different locking secret in particular being used than on the communication of the communication unit with external devices. The communication unit is therefore itself capable of encryption and is thus not dependent on whether and in what manner the control commands it receives are already encrypted.

Such embodiments have the advantage that it may thereby be ensured that the internal communication between the communication unit and the control unit of the drive module is always actually encrypted and that a fixed kind of encryption independent of the external communication may be received for it. The drive module may also be configured overall in this manner independently of which kind of encryption is used for the external communication. Only the communication unit has to be selected such that it is able to translate the control commands received from external into encrypted control signals that may be understood and implemented by the control unit of the drive module. The property of the communication unit to generate the control signals independently and to bring them into encrypted form in which the control signals may then be interpreted by the control unit contributes to the modularity of the electronic two-wheeler lock. For by combination of like respective drive modules having different communication units different electronic two-wheeler locks in accordance with the invention may be provided in a simple manner that may be addressed from outside in respective different manners, but that are each based on the same particularly securely configured drive module. This in particular simplifies the production of two-wheeler locks adapted to different two-wheelers or to different operating systems having respective different communication modes.

As part of the internal communication, the transmission of the (encrypted) control signals from the communication unit of the two-wheeler lock to the control of the drive unit preferably takes place in a wired manner. The signal transmission may also take place in a wired manner in the case of a bidirectional communication.

For the communication with external devices, the communication unit may have one or more interfaces that may be specifically configured for a specific communication transmission, e.g. radio-based or wired, for a specific communication content, e.g. relating to a control or relating to state information and/or configured for a specific communication protocol. In some embodiments, the communication unit has an interface to receive control commands, in particular by radio, from an external user device and/or from a vehicle system of the two-wheeler. Such an interface represents a control command input to this extent. The communication preferably takes place bidirectionally in that the communication unit, for example, also has an interface to output status reports, in particular by radio, to an external user device and/or to a vehicle system of the two-wheeler. Such an interface represents a status output to this extent.

The electronic two-wheeler lock may be flexibly integrated into different systems by such interfaces, the systems in particular being able to be provided with electrically driven or assisted two-wheelers, for instance for setting operation functions and/or comfort functions. Such a system may, for example, be configured as a kind of control device network, e.g. similar to a CAN bus as in cars. In some embodiments, a bidirectional communication is useful when the electronic two-wheeler lock only communicates with an individual external operating device that, for instance, serves to identify an authorized user using a key and thereupon to unlatch the two-wheeler lock by corresponding control commands. For not only an unlatching may be triggered with reference to the status reports transmitted by the two-wheeler lock, but it may also, for example, be displayed whether the unlatching status or the latched status is present, whether the latch element is in the open position or in the closed position and/or whether a malfunction of the two-wheeler lock is present.

The communication unit may, for example, be configured to communicate over RFID (radio frequency identification), in particular NFC (near field communication), over Bluetooth, GSM (mobile radio), Wi-Fi (IEEE 802.11) or in another radio-based manner. In general, alternatively or additionally, communication may also take place via acoustic and/or optical signals. Furthermore, the communication unit may then be configured to determine its location with reference to received signals so that, for instance, control signals may also be received independently of the location or control signals and/or status reports may be generated and output. The signals used for a spatial determination may be based on one of the named techniques. In addition, the communication unit may be configured to receive and evaluate GPS signals. Alternatively or additionally to a radio-based communication, the communication unit may also be configured for a wired communication and may in this manner in particular be connected to a vehicle system of the two-wheeler.

A further possibility of how the communication unit may be addressed from outside is based on magnetic interaction. This may in particular be used to transmit a manual actuation, for instance for triggering an opening or closing, an unlatching or latching of the latch element, from an outer side of the lock to the communication unit. The advantage of such a transmission comprises the fact that it may take place currentlessly unlike a transmission by radio and does not require a transmitter and, unlike a wired transmission, does not require any aperture of a lock housing of the two-wheeler lock. The two-wheeler lock may, for example, comprise a lock housing that substantially outwardly delineates the two-wheeler lock, with then a movable actuation element being able to be provided at an outer side of the lock housing that has an effect on the communication unit magnetically (directly or at least indirectly, e.g. via a magnetic sensor or switch) in dependence on its position and may thereby trigger different reactions of the communication unit.

The present disclosure therefore also relates, independently of the above-described two-wheel locks, to an electronic two-wheeler lock having a latch element that is movable between an open position and a closed position, having a blocking mechanism that blocks the latch element against a departure from the closed position in the latched state and releases it for a departure from the closed position in an unlatched state, having an electric drive unit that is configured to move the blocking mechanism into the unlatched state, and having a control unit that is configured to control the drive unit, wherein the two-wheel lock comprises a communication unit and a lock housing in which at least the communication unit is received, wherein an actuation element is movably supported at an outer side of the lock housing remote from the communication unit and is configured to magnetically (directly or at least indirectly) address the communication unit in dependence on its respective position through the lock housing to output a control signal to the control unit. In another respect, the two-wheeler lock may be configured in accordance with any one of the above-described embodiments.

A nearby actuation of the electronic two-wheeler lock may also be made possible, in particular in addition to communication possibilities from a distance, by such a magnetic address of the communication unit from the outside without additional apertures having to be provided in the lock housing for this purpose. The lock housing may, for example, comprise plastic or another magnetically permeable material as the material. Since an address of the communication unit is possible through the lock housing due to the magnetic interaction, the lock housing may be closed despite the possibility of a manual actuation taking place locally from the outside (for example only apart from an opening through which the latch element may project, in particular move in or out, from the lock housing). A reliable sealing of the inner space of the lock housing and of the components or modules received therein with respect to moisture and/or dirt may be achieved in this manner.

The actuation element preferably has a permanent magnet. In addition, the actuation element may be preloaded into a specific position, with then an actuation taking place to trigger an action, in particular by setting the actuation element into an opposite position. A plurality of positions may also be provided in which a respective action is triggered. The actuation element may, for example, be a sliding button that may e.g. be configured as a spring-loaded slide at which a permanent magnet may be arranged. The permanent magnet here does not necessarily have to be provided at a directly actuated element, but may rather also be arranged at an only indirectly actuated element or component. In some embodiments, the position of the permanent magnet is in a defined (direct or indirect) relationship with the respective position or actuation of the actuation element. To be able to be addressed in a magnetic manner, the communication unit may, for example, have a magnetic field sensor or a magnetic switch, e.g. a Hall sensor or a reed contact, or may at least be connected to such a component for an at least indirect addressing via which component the presence of a specific position of the actuation element or of the permanent magnet may be detected and thereupon a signal may optionally be triggered.

Such a magnetic actuation element may generally also be provided with other kinds of locks to trigger a reaction in the interior of the lock by an actuation at the outer side of the lock over the lock housing. The present disclosure also relates to a lock having a closing mechanism that may, for example, comprise the latch element and the blocking mechanism and, optionally, the control unit and/or the drive unit and having a lock housing in which the closing mechanism is received, wherein the lock further comprises an actuation element that is movably supported at an outer side of the lock housing remote from the lock mechanism and is configured to interact magnetically (directly or at least indirectly) with the closing mechanism through the lock housing in dependence on its respective position, in particular to magnetically switch a contact of the closing mechanism and/or to magnetically trigger an adjustment of the closing mechanism.

As described above, the electric drive unit is configured to set the blocking mechanism of the two-wheeler lock into the unlatched state. In some other embodiments, the electric drive unit is additionally configured to set the blocking mechanism into the latched state. In contrast to the adjustment of the blocking mechanism into the unlatched state, a check does not necessarily have to be made, e.g. using a key, as to whether, for an adjustment into the latched state, the person who wants to trigger the adjustment is also authorized to do so. It nevertheless contributes to the comfort of the actuation of the two-wheeler lock even though the latching takes place driven by the electric drive unit. For then the two-wheeler lock does not need to be actuated for the latching where it is attached to the two-wheeler and where it is possibly not easily accessible, but may rather be actuated from an easily accessible point, e.g. from the handlebars, or also from a distance. For example, the two-wheeler lock could be latched, similar to a passenger vehicle, on departing by a manual actuation of a radio transmitter or automatically by the breaking off of a near radio link occurring due to the moving away. However, a safety device and/or a safety check is/are preferably provided to prevent the latch element from being accidentally moved into the closed position during the ride.

The control unit may, for example, be configured as a microcontroller or may comprise a microcontroller. The control unit may set the blocking mechanism into the unlatched state via the electric drive unit. The blocking mechanism may, for example, comprise a blocking element that is movable between a latched position in which it engages behind the latch element in its closed position and thus blocks it against departing from the closed position and an unlatched position in which it releases the latch element for a departure from the closed position, wherein the drive unit is configured to move the blocking element, in particular in dependence on a corresponding control by the control unit, into the unlatched position or optionally also into the latched position.

In some other embodiments, the blocking action of the blocking mechanism may, however, also be achieved in a different manner than by a blocking element engaging behind the latch element; for example, by a suppression of the electric drive unit, in particular when it is in a fixed drive relationship with the latch element. The blocking mechanism may also be integrated into the electric drive unit to this extent. The electric drive unit may, for example, comprise an electric motor whose output is drive-effectively connected to the latch element directly or via a transmission. When the electric motor is self-locking in the stationary state, the latching state may then generally also be achieved by a simple stopping of the electric motor. The provision of a separate blocking mechanism that in particular blocks the latch element against a departure from the closed position in a mechanical manner and/or in a shape-matched manner, is, however, useful since a greater reliability against an attempt of a violent displacement of the latch element into the open position may be achieved in this manner.

In some other embodiments, the electric drive unit is additionally configured to move the latch element into the open position and/or into the closed position. The electric drive unit in such an embodiment may therefore not only be used to set the unlatched state and optionally also the latched state of the blocking mechanism to unlatch the latch element or to latch it in its closed position, but may also be used to move the latch element actively out of the open position into the closed position and/or, when it is unlatched, conversely from the closed position into the open position. Such an electronic two-wheeler lock then does not need to be manually actuated at all, but may rather be operated completely from a distance in a comfortable manner.

In some other embodiments, the electronic two-wheeler lock further comprises a lock housing in which the drive module and the communication unit as well as optionally further modules of the two-wheeler lock are received. In other words, the electronic two-wheeler lock then has at least two housings, namely the lock housing, on the one hand, that in particular serves to substantially delineate the total two-wheeler lock toward the outside and the module housing of the drive module, on the other hand, that is received in the lock housing. An at least two-stage mechanical securing of the components of the drive module thereby results that are first protected together with further components of the two-wheeler lock by the lock housing, but are additionally protected within the lock housing by the module housing that is in particular harder and/or mechanically more stable than the lock housing.

The latch element is expediently in particular at least not completely received in the lock housing in the closed position since it has to cooperate with the two-wheeler, in particular with the spokes of a wheel, outside the two-wheeler lock for the closing function of the two-wheeler lock. A drive relationship must furthermore be present between the electric drive unit and the latch element, the drive relationship having to be able to take place over the module housing in which the drive unit is received. A transmission may, for instance drive-effectively couple the electric drive unit in the module housing to the latch element outside the module housing for this purpose. In some embodiments, the latch element is in contrast at least partly received in the module housing of the drive module so that the electric drive unit may cooperate with the latch element within the module housing. The cooperation of the drive unit with the latch element is also mechanically protected against an intervention from outside by the module housing in this manner. In addition, in such an embodiment the blocking mechanism may also cooperate with the latch element within the module housing so that the blocking of the latch element is also protected from interventions from outside in the latched state.

It is furthermore useful in connection with the output of status reports for the drive module to comprise at least one sensor that is configured to detect a position of the latch element, a state of the blocking mechanism and/or a state of the drive unit and to output it/them to the control unit. It may in particular then be determined by such a sensor whether the latch element is in the open position or in the closed position and/or whether the latched state or the unlatched state of the blocking mechanism is present. It may also be detectable as states of the drive unit by the sensor, for example, whether the drive unit is at a standstill or actually drives the latch element, for example in the direction in which it may be driving. Such sensor may e.g. be configured as rotary encoders or position encoder and may e.g. comprise Hall sensors and/or microswitches.

In some embodiments, the control unit is configured to output a status signal to the communication unit. The status signal is here based on information the control unit receives from one or more sensors of the drive module. In some embodiments, the control unit outputs the status signal to the communication unit in encrypted form. A bidirectional communication that is encrypted in both directions may therefore in particular take place between the control unit and the communication unit. The total internal communication within the two-wheeler lock may thus be encrypted so that overall a high security against technical signal manipulations is achieved.

In addition to the drive module and to the communication unit that may be also configured as a module, the electronic two-wheeler lock may have even further modules that are configured as closed functional units. In some other embodiments, the electronic two-wheeler lock may furthermore comprise an energy module that is configured to supply the drive module and optionally the communication unit with energy. Since an energy module may be replaced more easily than an integrated energy supply, such an embodiment allows that the two-wheeler lock may be simply adaptable to the respective available energy source and its specifications by selection of a suitable respective energy module. Different energy modules may thus e.g. be provided for different operating voltages.

In some embodiments, the energy module comprises an energy storage device and/or an interface via which it is supplied with energy from an external energy source, from an external energy store, or from a vehicle system of the two-wheeler. The energy storage device may, for example, be a battery or rechargeable battery so that the electronic two-wheeler lock may be independent of an external energy supply. The electronic two-wheeler lock may, however, alternatively or additionally also obtain its energy from an external energy source such as a dynamo. In the use of the electronic two-wheeler lock at a two-wheeler that has an electric (auxiliary) drive and that anyway takes along an energy store for it, the energy module may furthermore also be configured to obtain energy from this energy store that is external with respect to the two-wheeler lock. In this manner, a user only has to monitor the charge state of an energy store to replace or charge it in good time. The electronic two-wheeler lock may here be connected to the external energy store directly or via a vehicle system of the respective two-wheeler fed by the energy store.

It is furthermore when a communication circuit board of the communication unit and/or the energy storage device of the energy module, and in some embodiments, the total communication unit and/or the total energy module, is/are accessible and/or may at least be made accessible for a replacement in a simple manner. The two-wheeler lock may for this purpose have a structure that may be pulled out and may be pushed back in again to the remaining two-wheeler lock, in particular out of and into a lock housing of the two-wheeler lock, in the manner of a drawer, wherein the communication circuit board and/or the energy storage device or the communication unit and/or the energy module are received in this structure or are supported at this structure. These elements may thereby e.g. be made accessible for a replacement in a simple manner by pulling out the drawer-like structure. In this respect, the structure may generally be completely removable from the remaining two-wheeler lock. It may, however, also be sufficient for the structure only to be able to be pulled out of the remaining two-wheeler lock up to and into an open position in which the respective elements may be removed from the structure or may be released therefrom. After the insertion or attachment of new elements, the drawer-like structure may then be pushed back into a closed position in which it is received in the lock housing with which it then preferably terminates in a substantially flush manner. The two-wheeler lock may here be configured such that, on the insertion or attachment of an element into or at the structure or on the reaching of the closed position, contacts are automatically established between the elements arranged in or at the structure and other elements of the two-wheeler lock, e.g. such that the energy storage device is automatically connected to the drive module to supply it with energy.

The drawer-like structure may in particular be formed by a compartment that may be pulled out and that is open to one side. The structure may here also comprise a cover to close the open side of the compartment. The cover may preferably only be opened when the structure has at least party been pulled out of the remaining two-wheeler lock. In this manner, the elements received in the compartment are secured to the outside and are in particular protected from falling directly out of the compartment on the pulling out of the drawer-like structure.

In some embodiments, such a drawer-like structure may also be provided with other types of locks to make a communication unit, an energy module, an element thereof, or another element of the lock, in particular a functional element that contributes to a function of the lock, accessible for a replacement, for instance. The present disclosure therefore also relates, independently of the above-described two-wheel locks, to a lock that has a structure that may be pulled out of and pushed back into the remaining lock, in particular out of and into a lock housing of the lock, in the manner of a drawer, with an element of the lock optionally being received in this structure or being supported at this structure, in particular to be accessible for a replacement. The lock may in another respect have individual features or a plurality of features of the above-described two-wheeler locks. In addition, the drawer-like structure may in particular be configured in one of the manners described above for the drawer-like structure of a two-wheeler lock.

The modular system in accordance with the present disclosure for forming an electronic two-wheeler lock comprises a drive module having a module housing in which at least one blocking mechanism is received that blocks a latch element of a two-wheeler lock against departing from a closed position in a latched state and releases the latch element for a departure from the closed position into an open position in an unlatched state, in which an electric drive unit is received that is configured to set the blocking mechanism into the latched state, and in which a control unit is received that is configured to control the drive unit. The system additionally comprises a plurality of different kinds of communication modules that are configured to generate control signals and to output them to the control unit of the drive module in encrypted form and of which a respective communication module is selected and may be connected to the drive module to form the two-wheeler lock. The drive module and the communication module may be specifically designed for the connection of a respective communication module to the drive module for this purpose. The modular system is in particular suitably configured for configuring a two-wheeler lock in accordance with one of the above-described embodiments.

The drive module may in particular be configured in accordance with the respective drive module of any one of the above-described embodiments of a two-wheeler lock in accordance with the present disclosure. The communication modules may furthermore each be configured in accordance with a respective communication unit of the above-described embodiments of a two-wheeler lock in accordance with the present disclosure or may each comprise such a communication unit.

The modular system allows the use of the same respective drive module for configuring different electronic two-wheeler locks that have a generally similar design, but may in particular differ with respect to their respective communication abilities and the obtaining of the respective desired communication capabilities by its combination with a suitably selected communication module. Since the drive module is encapsulated in its own module housing and since the respective communication module transmits control signals to the control unit of the drive module in encrypted form, it is ensured, independently of which communication module is selected for the respective two-wheeler lock, that the respective two-wheeler lock formed in this manner has a particularly high security against manipulation attempts.

The plurality of communication modules from which a respective one may be selected in dependence on the specific demands for configuring a respective two-wheeler lock may in particular differ with respect to the technology on which the respective communication, for example with an external user device and/or with a vehicle system of the two-wheeler, should be based. Possible technologies here are e.g. radio technologies such as RFID, NFC, Bluetooth and/or GSM and optionally alternatively or additionally GPS. An optical or acoustic signal transmission may generally also be considered. One or more communication modules of the modular system may furthermore be configured for a wired communication, e.g. over a corresponding interface to a vehicle system of the two-wheeler. In addition, a magnetic addressing of a respective communication module may furthermore also be considered such as has in particular been described above for an electronic two-wheeler lock. For this purpose, the respective communication module may, for instance, have a magnetic field sensor or a magnetic switch or may be at least indirectly addressable via such a component.

In some other embodiments, the system furthermore comprises a plurality of different kinds of energy modules that are configured to supply the drive module and optionally the respective communication module with energy and of which a respective energy module is selected and may be connected to the drive module and optionally to the respective communication module to configure the two-wheeler lock. An even greater number of two-wheeler lock variants may be implemented by the selection between different kinds of energy modules, wherein a respective two-wheeler lock may be adapted individually with respect to a respective desired kind of energy supply independently of its respective communication abilities defined by the communication module used. The energy modules may here in particular be configured in accordance with the respective energy module of one of the above-described embodiments of a two-wheeler lock in accordance with the present disclosure. For example, a respective energy module may be configured as a rechargeable battery, as a battery, or as an interface to an external energy supply or to a vehicle system of the two-wheeler or may at least comprise such an element.

BRIEF DESCRIPTION OF THE DRAWINGS

The present disclosure will be further described in the following only by way of example with reference to the FIGURE.

DETAILED DESCRIPTION

Figure 1:
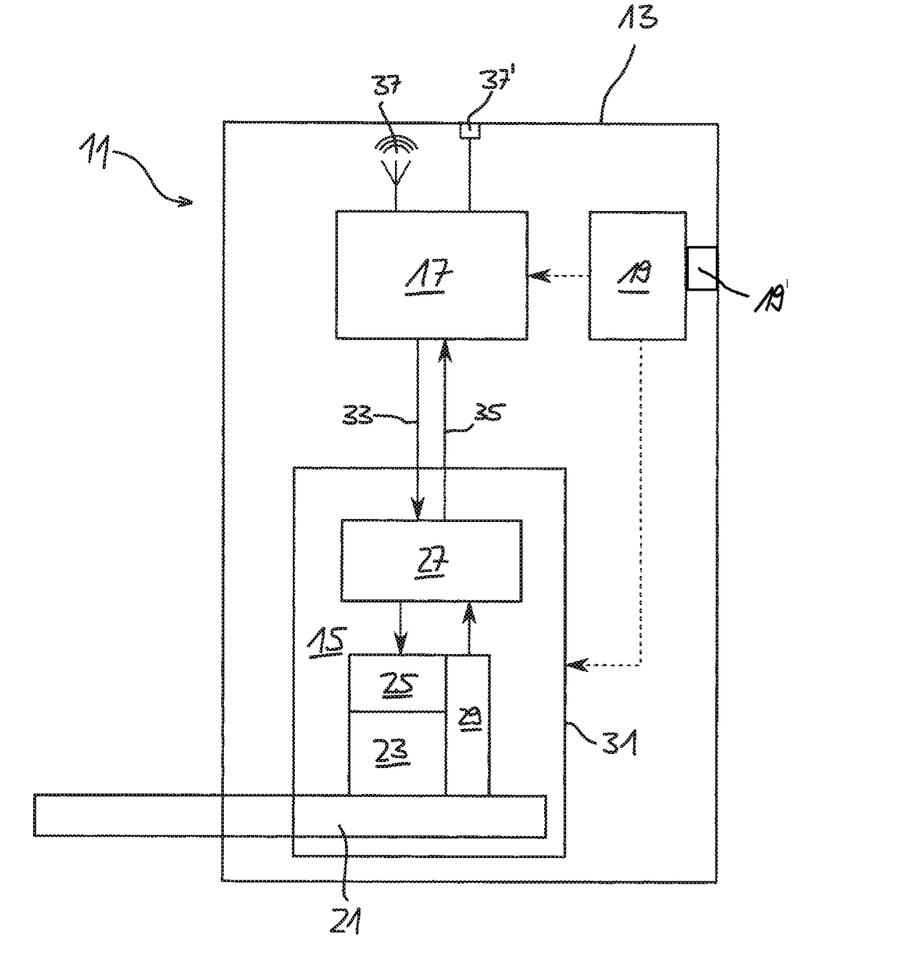
FIG. 1 shows in a schematic representation an overview of the arrangement and the interaction of the elements of an embodiment of the two-wheeler lock in accordance with the present disclosure. This embodiment additionally represents the result of the configuration of a two-wheeler lock by an embodiment of the modular system in accordance with the present disclosure, wherein only that communication module and that energy module are shown of the plurality of communication modules and of the plurality of energy modules this system provides that were selected and used for the specifically configured two-wheeler lock.

The electronic two-wheeler lock 11 shown comprises a lock housing 13 in which a drive module 15, a communication unit 17 configured as a separate communication module, and an energy module 19 are received. A latch element 21 of the two-wheeler lock 11 partly projects out of the lock housing 13 to engage in a closed position between the spokes of one of the wheels of a two-wheeler, not shown, at which the two-wheeler lock 11 is arranged and thereby to block the wheel. The latch element 21 is movable between the closed position and an open position in which the blocking of the wheel is canceled. Contrary to what is schematically shown, the latch element 21 may in particular be formed as a round hoop and may have the shape of a segment of a circle.

The drive module 15 comprises a blocking mechanism 23 that is adjustable between a latched state in which it blocks the latch element 21 in its closed position and an unlatched state in which it releases the latch element 21 for a departure from the closed position. The drive module 15 furthermore comprises an electric drive unit 25 that is drive-effectively coupled to the blocking mechanism 23 such that it may adjust the blocking mechanism 23 from the latched state into the unlatched state. As symbolized by an arrow, the electric drive unit 25 may be controlled by a control unit 27 of the drive module 15 to make such an adjustment of the blocking mechanism 23. In this manner, the latching of the latch element 21 in the closed position may be canceled by the drive module 15.

The drive module 15 furthermore comprises a plurality of sensors 29 that are shown schematically as a single block and that are configured overall to detect the position in which the latch element 21 is located, which state the blocking mechanism 23 has adopted, and whether the electric drive unit 25 is in operation. The information detected in this manner is output by the sensors 29 to the control unit 27, which is symbolized by an arrow between the sensors 29 and the control unit 27.

The drive module 15 has a module housing 31 in which the blocking mechanism 23, the electric drive unit 25, the control unit 27, and the sensors 29 are completely received and in which the latch element 21 is also partly received. The module housing 31 delineates the drive module 15 with respect to the communication unit 17 and the energy module 19 and is completely arranged within the lock housing 13 so that the components of the drive module 15 are surrounded twice, namely, on the one hand, by the lock housing 13 and, on the other hand, additionally by the module housing 31. The components of the drive module 15 are particularly securely protected from intervention from outside by this additional encapsulating in the module housing 31.

The communication unit 17 is connected in a technical signal manner to the control unit 27 of the drive module 15 so that it may output control signals 33 to the control unit 27 and may receive status signals 35 from the control unit 27. At least the control signals 33 are transmitted in encrypted form here. It is thereby precluded that the control unit 27 may be addressed from the outside in a manipulative manner. The communication unit 17 is configured to generate and to encrypt the control signals 33. The control signals 33 are here generated in dependence on control commands that the communication unit 17 receives from outside the two-wheeler lock 11, e.g. from an external user device or from a vehicle system of the two-wheeler.

The communication unit 17 of the two-wheeler lock shown has an interface 37 that is configured for radio-based communication for communication with such external devices or systems. A further interface 37' of the communication unit 17 is also shown in FIG. 1 that is configured for a wired communication and that may be provided alternatively or additionally to the radio-based interface 37. In addition, the communication unit 17 is configured for the use of a specific communication protocol for the communication with external devices or systems. This external communication also in particular takes place in encrypted form, with the kind of encryption not having to correspond to that of the encryption used for the internal signal transfer.

When the two-wheeler lock 11 assists another communication protocol and/or have other interfaces for the external communication, a correspondingly differently configured communication module may simply be installed on its production due to the modular design of the two-wheeler lock. In addition, the communication unit 17 in the two-wheeler lock 11 may also be replaced by another communication module. The kind of signal transmission between the respective communication unit 17 and the drive module 15 does not change so that the same drive module 15 may be used in each case. The communication unit 17 may in particular receive control commands via the respectively provided interface 37, 37' and may generate control signals 33 in dependence on received control commands that it then outputs to the control unit 27 of the drive module 15 in encrypted form.

The electronic two-wheeler lock 11 comprises as a further module the energy module 19 that in the embodiment shown comprises an energy store in the form of a rechargeable battery. The energy module 19 may include an energy storage device and/or an interface 19' via which it is supplied with energy from an external energy source, from an external energy store, or from a vehicle system of the two-wheeler. Both the drive module 15 and the communication unit 17 are supplied with energy from the energy module 19, which is symbolized by respective broken arrows. In a similar manner to the communication unit 17, the energy module 19 may also be selected as required from a plurality of different energy modules, with an alternative energy module e.g. being able to be configured for a connection to a central energy store of the two-wheeler so that such an energy module then does not store the energy itself, but substantially only forwards it. In this respect, a voltage transformation may, for example, also take place, with different energy modules being able to be provided for different desired transformations. In addition, an energy module may, for instance, also comprise a buffer store for buffering externally obtained energy.

Due to its modularity, the two-wheeler lock 11 may be used with many different two-wheelers and enables a securing of a two-wheeler for the respective user that is comfortable to operate. The fact that the drive module 15 is encapsulated in its own module housing 31 and the fact that the internal communication between the communication unit 17 and the drive module 15 is encrypted in accordance with the present disclosure, with this internal encryption generally being independent of the kind of external communication, additionally provide a high degree of security against mechanical and technical signal manipulations.

The invention claimed is:

1. An electronic two-wheeler lock comprising:
    a latch element that is movable between an open position and a closed position;
    a blocking mechanism that blocks the latch element in a latched state against departing from the closed position and releases the latch element for a departure from the closed position in an unlatched state;
    an electric drive unit that is configured to move the blocking mechanism into the unlatched state; and
    a control unit that is configured to control the electric drive unit,
    wherein the two-wheeler lock has a modular design and comprises a drive module and a communication unit, with the drive module comprising a module housing in which at least the blocking mechanism, the electric drive unit, and the control unit are received to be protected from mechanical effects from the outside and which delineates the drive module with respect to the communication unit and optionally with respect to further modules of the two-wheeler lock;
    wherein the latch element is at least partly received in the module housing of the drive module; and
    with the control unit being configured to receive control signals from the communication unit in encrypted form and to control the electric drive unit in response to the control signals.

2. The two-wheeler lock in accordance with claim 1, wherein the communication unit is configured to receive control commands and to generate a respective control signal in dependence on a respective received control command and to output the respective control signal to the control unit of the drive module in encrypted form.

3. The two-wheeler lock in accordance with claim 1, wherein the communication unit has an interface to receive control commands from an external user device and/or from a vehicle system of the two-wheeler.

4. The two-wheeler lock in accordance with claim 3, wherein the interface is configured to receive the control commands by radio.

5. The two-wheeler lock in accordance with claim 3, wherein the communication unit has an interface to output status reports to an external user device and/or to a vehicle system of the two-wheeler.

6. The two-wheeler lock in accordance with claim 1, wherein the two-wheeler lock comprises a lock housing in which at least the communication unit is received, with an actuation element being movably supported at an outer side of the lock housing remote from the communication unit, with the actuation element being configured to magnetically address the communication unit in dependence on its respective position through the lock housing to output a control signal to the control unit.

7. The two-wheeler lock in accordance with claim 6, wherein the actuation element is preloaded and/or has a permanent magnet.

8. The two-wheeler lock in accordance with claim 1, wherein the electric drive unit is configured to move the blocking mechanism into the latched state.

9. The two-wheeler lock in accordance with claim 1, wherein the electric drive unit is configured to move the latch element into the open position and/or into the closed position.

10. The two-wheeler lock in accordance with claim 1, wherein the electronic two-wheeler lock furthermore comprises a lock housing in which at least the drive module and the communication unit are received.

11. The two-wheeler lock in accordance with claim 1, wherein the drive module further comprises at least one sensor that is configured to detect and output to the control unit at least one of: a position of the latch element; a state of the blocking mechanism; and a state of the drive unit.

12. The two-wheeler lock in accordance with claim 1, wherein the control unit is configured to output a status signal to the communication unit.

13. The two-wheeler lock in accordance with claim 12, wherein the control unit is configured to output the status signal to the communication unit in encrypted form.

14. The two-wheeler lock in accordance with claim 1, wherein the electronic two-wheeler lock further comprises an energy module that is configured to supply at least the drive module with energy.

15. The two-wheeler lock in accordance with claim 14, wherein the energy module comprises at least one of: an energy storage device; and an interface via which the energy module is supplied with energy from an external energy source, from an external energy store, or from a vehicle system of the two-wheeler.

16. The two-wheeler lock in accordance with claim 1, wherein the two-wheeler lock has a structure that may be pulled out of and may be pushed back into the remaining two-wheeler lock in the manner of a drawer, with at least the communication unit being received in the structure or being supported at the structure to be accessible for a replacement.

17. The two-wheeler lock in accordance with claim 16, wherein an energy module is received in the structure or is supported at the structure to be accessible for a replacement.

18. A modular system for forming an electronic two-wheeler lock,
    the system comprising:
    a drive module having a module housing in which at least one blocking mechanism is received that blocks a latch element of a two-wheeler lock against departing from a closed position in a latched state and releases the latch element for a departure from the closed position into an open position in an unlatched state, in which an electric drive unit is received that is configured to set the blocking mechanism into the latched state, and in which a control unit is received that is configured to control the electric drive unit; and
    a plurality of different kinds of communication modules that are configured to generate control signals and to output them to the control unit of the drive module in encrypted form and of which a respective communication module is selected and may be connected to the drive module to form the two-wheeler lock, wherein the latch element is at least partly received in the module housing of the drive module.

19. The modular system in accordance with claim 18, wherein the system furthermore comprises a plurality of different kinds of energy modules that are configured to supply at least the drive module with energy and of which a respective energy module is selected and may be connected to the drive module to form the two-wheeler lock.

20. An electronic two-wheeler lock comprising:
a latch element that is movable between an open position and a closed position;
a blocking mechanism that blocks the latch element in a latched state against departing from the closed position and releases the latch element for a departure from the closed position in an unlatched state;
an electric drive unit that is configured to move the blocking mechanism into the unlatched state; and
a control unit that is configured to control the electric drive unit, wherein the two-wheeler lock has a modular design and comprises a drive module and a communication unit, with the drive module comprising a module housing in which at least the blocking mechanism, the electric drive unit, and the control unit are received to be protected from mechanical effects from the outside and which delineates the drive module with respect to the communication unit and optionally with respect to further modules of the two-wheeler lock;

wherein the communication unit is configured to receive control commands, to generate a respective control signal in dependence on a respective received control command, and to bring the respective control signal into encrypted form, and to output the respective control signal to the control unit of the drive module in encrypted form; and with the control unit being configured to receive control signals from the communication unit in encrypted form and to control the electric drive unit in response to the control signals.

\* \* \* \* \*